US007210043B2

(12) United States Patent
Miyazaki et al.

(10) Patent No.: US 7,210,043 B2
(45) Date of Patent: Apr. 24, 2007

(54) TRUSTED COMPUTER SYSTEM

(75) Inventors: Kunihiko Miyazaki, Yokohama (JP);
Shinji Itoh, Yokohama (JP); Hiroshi Yoshiura, Tokyo (JP); Kazuo Takaragi, Ebina (JP); Masato Arai, Yokohama (JP); Toshiaki Arai, Machida (JP); Takeshi Matsuki, Musashino (JP); Hisashi Toyoshima, Hachiohji (JP)

(73) Assignee: Hitachi, Ltd., Tokyo (JP)

( * ) Notice: Subject to any disclaimer, the term of this patent is extended or adjusted under 35 U.S.C. 154(b) by 678 days.

(21) Appl. No.: 10/081,061

(22) Filed: Feb. 20, 2002

(65) Prior Publication Data

US 2002/0174369 A1 Nov. 21, 2002

(30) Foreign Application Priority Data

Apr. 24, 2001 (JP) .............................. 2001-125224

(51) Int. Cl.
*G06F 21/00* (2006.01)
(52) U.S. Cl. ........................... 713/193; 726/28; 726/17
(58) Field of Classification Search ................ 713/152, 713/182, 189, 201, 193–194, 164–167; 726/17, 726/28
See application file for complete search history.

(56) References Cited

U.S. PATENT DOCUMENTS 4,713,753 A * 12/1987 Boebert et al. ............. 711/164
5,163,147 A * 11/1992 Orita .............................. 707/9
5,771,379 A * 6/1998 Gore, Jr. ....................... 707/101
6,006,228 A * 12/1999 McCollum et al. ............. 707/9
6,754,820 B1 * 6/2004 Scheidt et al. ............... 713/166
6,947,556 B1 * 9/2005 Matyas et al. ................ 380/29
2002/0099666 A1 * 7/2002 Dryer et al. ................... 705/71

FOREIGN PATENT DOCUMENTS

JP 11-149385 6/1999
JP 2000-313123 11/2000

OTHER PUBLICATIONS

DEC, "Security," white paper, Mar. 1996, pp. 1-19.*
Department of Defense Standard, "Trusted Computer System Evaluation Criteria" (Dec. 1985), DoD 5200.28-STD, pp. 21-24.
Alfredo J. Menezes, et al., "Discrete Mathematics and Its Applications," *Handbook of Applied Cryptography* (1997) Kenneth H. Rosen, ed., CRC Press, Boca Raton, FL, Ch. 7 "Block Ciphers," pp. 228-231, 250-257, 396-403.

* cited by examiner

*Primary Examiner*—Gilberto Barrón
*Assistant Examiner*—Andrew L. Nalven
(74) *Attorney, Agent, or Firm*—Townsend and Townsend and Crew LLP

(57) ABSTRACT

Techniques of improving the safety of an information processing system at low cost are provided, the information processing system having an OS provided with an access control function based upon discretionary access control for preventing illegal accesses to files. A method and apparatus for providing the information processing system with functions and areas usable only by a specific user different from a system administrator. The areas are provided with an access control function in order to prevent the access control function from being tampered.

16 Claims, 10 Drawing Sheets

FIG.6

| FILE NAME | SECURITY LEVEL |
|---|---|
| C:¥home¥user1¥secret.txt | BUSINESS DIVISION · TOP SECRET<br>PLANNING DIVISION · TOP SECRET |
| C:¥home¥user2¥research_report.doc | RESEARCH DIVISION · TOP SECRET |
| D:¥public_data¥public.bmp | RESEARCH DIVISION · UNCLASSIFIED<br>BUSINESS DIVISION · UNCLASSIFIED<br>PLANNING DIVISION · UNCLASSIFIED<br>RESEARCH DIVISION · UNCLASSIFIED |
| D:¥secret_data¥top_secret.doc | PERSONNEL DIVISION · SECRET |
| ... | ... |

6001 — FILE NAME column
6003 — SECURITY LEVEL column

FIG.7

| USER NAME | CLEARANCE |
|---|---|
| researcher | RESEARCH DIVISION · TOP SECRET<br>PLANNING DIVISION · TOP SECRET |
| guest | RESEARCH DIVISION · UNCLASSIFIED<br>BUSINESS DIVISION · UNCLASSIFIED<br>PLANNING DIVISION · UNCLASSIFIED<br>RESEARCH DIVISION · UNCLASSIFIED |
| president | RESEARCH DIVISION · TOP SECRET<br>BUSINESS DIVISION · TOP SECRET<br>PLANNING DIVISION · TOP SECRET<br>RESEARCH DIVISION · TOP SECRET |
| personnel_director | PERSONNEL DIVISION · SECRET |
| ... | ... |

7001 — USER NAME column
7003 — CLEARANCE column

FIG.8

SECURITY LEVEL OF FILE READABLE BY "researcher"

| | PERSONNEL DIVISION (8001) | BUSINESS DIVISION (8003) | PLANNING DIVISION (8005) | RESEARCH DIVISION (8007) |
|---|---|---|---|---|
| TOP SECRET (8009) | | | | |
| SECRET (8011) | | | | ○ |
| CONFIDENTIAL (8013) | | | ○ | ○ |
| UNCLASSIFIED (8015) | | | ○ | ○ |

SECURITY LEVEL OF FILE WRITABLE OR CREATABLE BY "researcher"

| | PERSONNEL DIVISION (8021) | BUSINESS DIVISION (8023) | PLANNING DIVISION (8025) | RESEARCH DIVISION (8027) |
|---|---|---|---|---|
| TOP SECRET (8029) | | | ○ | ○ |
| SECRET (8031) | | | ○ | ○ |
| CONFIDENTIAL (8033) | | | ○ | |
| UNCLASSIFIED (8035) | | | | |

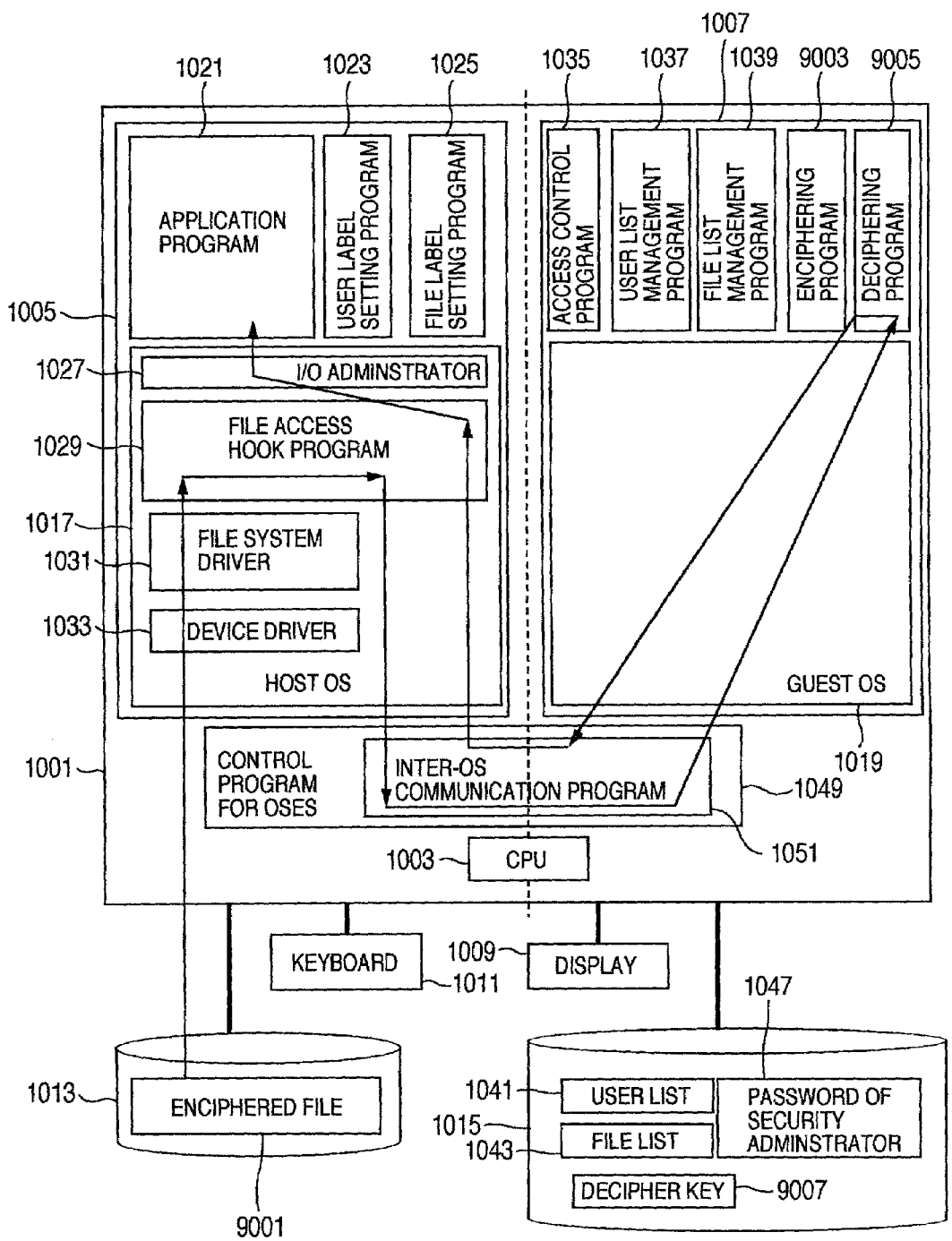

TRUSTED COMPUTER SYSTEM

BACKGROUND OF THE INVENTION

The present invention relates to techniques of preventing an illegal access to a file stored in an information processing system and ensuring high security.

In an information processing system using a computer, hardware resources are effectively utilized generally by using an operating system (OS) which provides a fundamental architecture for executing many application programs.

In the information processing system, files are protected by using a file access function which is one of the functions of OS. An OS widely used presently controls files through discretionary access control (DAC) in many cases. A user or a file owner (generally a file creator) arbitrarily sets users permitted to access the file and an access type (read only, read and alter, and the like) to thereby control file access.

In such an OS, a user having a special privilege called a system administrator is generally permitted to change all settings of the information processing system.

Some dedicated OSes assumed to be used in a high security environment are provided with a file access control function of mandatory access control (MAC) which is a more severe access control method. For example, in order to be authorized as class B1 or higher among the classes defined by Trusted Computer System Evaluation Criteria (TCSEC) of U.S.A. which is one of evaluation criteria of secure systems, OS is required to have the mandatory access control function.

TCSEC and mandatory access control are detailed in the document "Department of Defense Trusted Computer System Evaluation Criteria (DOD 5200.28-STD) December 1985.

In the information processing system having the mandatory access control, all files are assigned security levels (e.g., "top secret", "secret", "confidential", "unclassified" and the like in the order of higher level) and all users are assigned reliability, i.e., permission levels (called clearance) representative of the security levels of accessible files, e.g., "top secret", "secret", "confidential", "unclassified" and the like in the order of higher level. In accordance with these information, the system performs access control mandatorily.

Security functions such as file security levels and user clearance levels of the above-described dedicated OS are often managed by a user called a security administrator different from a system administrator. In this case, the information processing system can be managed more securely because not only the file creator but also the system administrator cannot lower the system security.

In an information processing system whose architecture for preventing illegal accesses to files relies upon OS having the access control function of discretionary access control, a user of file owner can set the accessible range of the file so that the user may intentionally or inadvertently leak important information.

In an information processing system having OS with the mandatory access control function, since such OS is not so usual to the user, user application programs are required to be developed newly so that it takes a cost and user convenience is lost.

Under these circumstances, techniques capable of improving the system safety at low cost have been long desired.

SUMMARY OF THE INVENTION

The invention provides techniques of improving the safety of information security of an information processing system without damaging user convenience.

The invention provides also a method and apparatus for providing an information processing system with functions and areas which can be used only by a certified user different from a system administrator.

The invention also provides a method and apparatus for preventing illegal actions during a start-up of the information processing system provided with the above-described techniques.

More specifically, the invention provides techniques of providing an information processing system with a mandatory access control function while already existing application programs are maintained usable, and an information processing system utilizing such techniques.

The invention also provides techniques of adding a mandatory access control function to an information processing system which runs already existing application programs under the management of an OS without the mandatory access control function, and an information processing system utilizing such techniques.

According to one aspect of the invention, two OSes including an OS (called a host OS) directly used by a user and operating an application program and an OS (called a guest OS) for reinforcing security, are operated by utilizing multi-OS control techniques. The multi-OS control techniques are disclosed in JP-A-11-149385.

According to the invention, it becomes very difficult that the security level is changed not only by a file creator but also by a system administrator on the host OS side, without using a dedicated OS.

More specifically, an access monitor process program monitors a file access to be executed under the management of the host OS, and a file access control program on the guest OS judges from a file security level and a user clearance whether the file access detected by the access monitor process program is legal, in order not to permit an illegal access.

A security administrator different from the system administrator who performs various settings of the host OS is used so that even the system administrator cannot change the security level. If the system administrator is permitted to have the privilege of the security administrator in accordance with the security policy of the whole system, the same person may take the roll of the two persons.

According to another aspect of the invention, the guest OS is provided with an access control function to prevent illegal actions relative to the access control function.

According to another aspect of the invention, it is possible to maintain the environment capable of mandatory access control even if the host OS is changed to provide multi-function and versatility.

In setting a user clearance level and a file security level, identification or authentication of the security administrator is performed to mitigate threat of illegal actions by the host OS side administrator.

A term "OS" used in the specification is intended to mean a program module having a function of accessing data or file in a storage medium in response to a user or program request, a function of identifying a requesting user or program, and a storage unit accessible through an exclusive control function. The OS has features: (1) capable of managing and detecting a file access, (2) capable of identifying an access requesting user, and (3) capable of identifying an access requesting application program. If an OS has these features, this OS falls in the category of the OS used in this specification.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing an example of a user list according to the first embodiment.

FIG. 7 is a diagram showing an example of a file list according to the first embodiment.

FIG. 8 is diagrams showing the security levels of files allowing a user "researcher" to access according to the first embodiment.

FIG. 9 is a diagram showing the outline structure of a computer realizing a second embodiment of the invention.

DETAILED DESCRIPTION OF THE EMBODIMENTS

The disclosures of all articles and references, including patent documents, mentioned in this application are incorporated herein by reference for all purposes.

Figure 1:
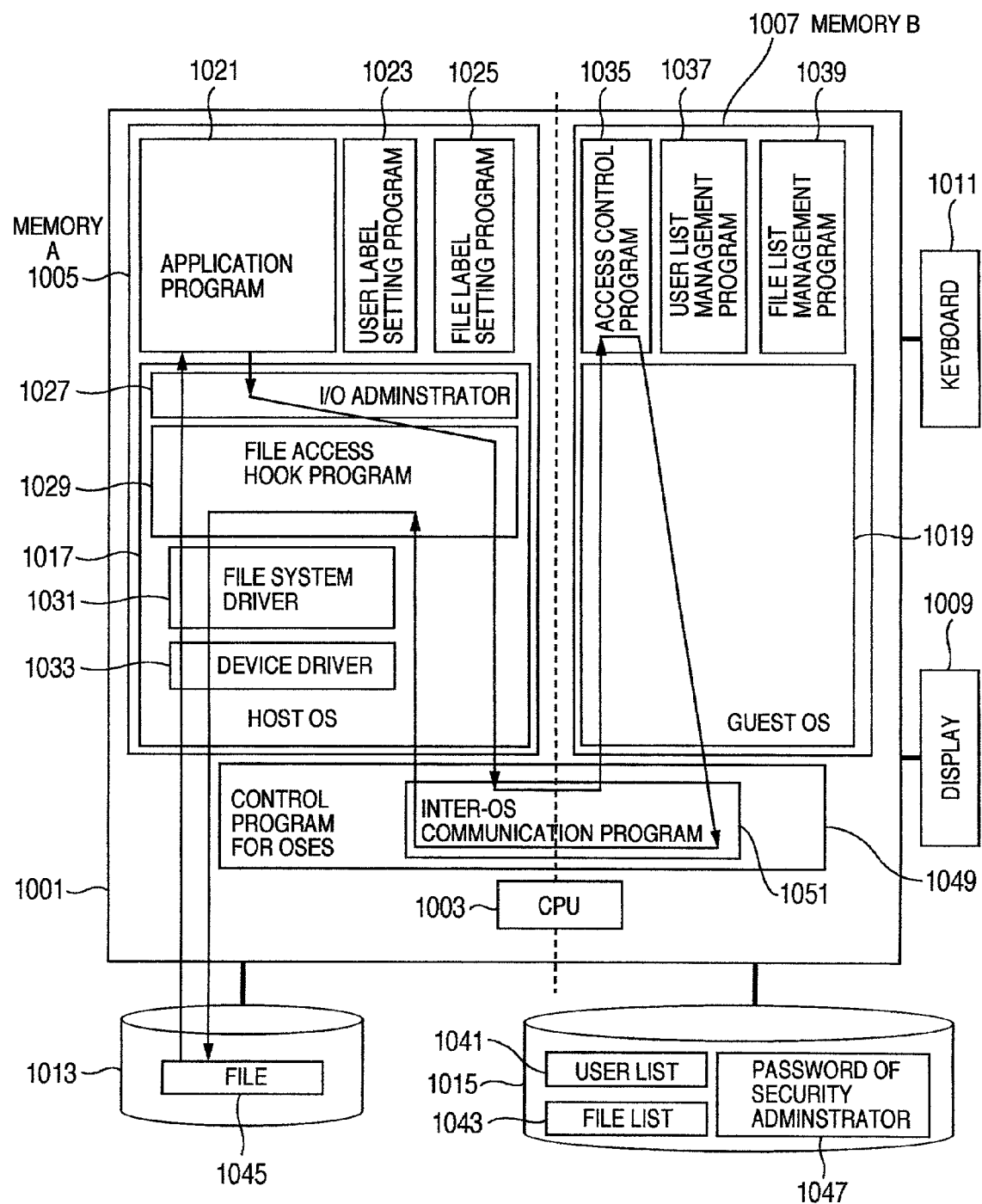
FIG. 1 is a diagram showing the outline structure of a computer realizing a first embodiment of the invention.

FIG. 1 is a diagram showing the structure of an information processing system according to an embodiment of the invention. A computer 1001 has: a CPU 1003 for executing each OS and each program (also called a processing unit) of the computer; a memory A1005 managed by a host OS 1017; and a memory B1007 managed by a guest OS 1019. The computer 1001 is connected to: input devices such as a keyboard 1011 and a mouse; output devices such as a display 1009; and storage devices such as a hard disc A1013 managed by the host OS 1017 and a hard disc B1015 managed by the guest OS 1019. Instead of the hard discs, the storage device may be a rewritable non-volatile memory such as a flash memory and an EEPROM. It is preferable that the storage device has a hardware tamper-resistance.

The host OS 1017 and a general application program which operates under the management of the host OS as well as in this embodiment a user label setting program 1023 for setting a label which defines a user clearance and a file label setting program 1025 for setting a label which defines a security level of each file, are loaded in the memory A1005 from the hard disc A1013. The host OS 1017 is provided with an I/O administrator 1027, a file system driver 1031 and a device driver 1033 as well as in this embodiment a file access hook program 1029 for hooking an access to a file 1045 in the hard disc A1013.

Hooking an access is to detect by some means an occurrence of an access to a file in the storage medium such as the hard disc A1013.

In hooking a file access, an interface prepared by an OS may be used, such as interfaces prepared for various drivers including the file system driver 1031 and device driver 1033.

In this embodiment, a file access hook program administrator 1029 is provided between the I/O administrator 1027 and file system driver 1031. With this file access hook program administrator 1029, the I/O administrator 1027 operates as if it instructs the file system driver 1031, whereas the file system driver 1031 operates as if it is instructed by the I/O administrator 1027. An occurrence of a file access can be recognized by an instruction issued from the I/O administrator 1027. Generally, in order to collectively manage various devices and process various function extensions, some OS is provided with such interfaces and a dedicated interface for file access hook.

Although not shown, the host OS 1017 is provided with a unit for realizing functions of a general OS, such as a unit for performing process management, memory management and the like.

The guest OS 1019 as well as an access control program 1035, a user list management program 1037 and a file list management program 1039 under the management by the guest OS 1019 is loaded in the memory B1007 from the hard disc B1015. The hard disc B1015 under the management by the guest OS 1019 stores a user list 1041 to be used by the user list management program 1037 and a file list 1043 to be used by the file list management program 1039.

In this embodiment, a file access by the application program 1021 running on the host OS 1017 is hooked by the file access hook program 1029.

Upon reception of a file access issued from the application program 1021, the I/O administrator 1027 issues a file access instruction to the file system driver 1031. This instruction is received by the file access hook program 1029 in behalf of the file system driver 1031. Before the file access instruction is passed to the file system driver 1031, the instruction is passed to the access control program 1035 by using an inter-OS communication program 1051 in multi-OS control programs 1049.

The access control program 1035 judges from the user list 1041 and file list 1043 whether or not the file access is legal, and returns a judgement result. If the file access is illegal, the file access hook program 1029 makes the file access be denied, whereas if the file access is legal, the file access hook program passes the requested file access instruction to the file system driver 1031.

In this embodiment, the access control program 1035 is executed not under the management of the host OS 1017 to which a user logs in but under the management of the guest OS 1019. This provides the following advantages: (1) a small danger of illegal alteration of the access control program 1035; (2) a limited range of checking whether the access control program has a security hole because of program bugs, and therefore easy maintenance; and (3) even if the host OS 1017 is changed to provide multi-function and versatility, the access control is possible without altering the fundamental architecture so that the OS development cost can be reduced.

In this embodiment, the file security levels have four levels "unclassified", "confidential", "secret" and "top secret" in the order of lower security level. The corresponding user clearance have similarly four levels "unclassified", "confidential", "secret" and "top secret" in the order of lower reliability level. Whether a file access is legal or illegal is judged in accordance with the file security level and user clearance.

The number of security levels may be set freely for each system. The file security level is set in one-to-one correspondence with the user clearance.

Files and users can be made belonging to four compartments including "personnel division", "business division", "planning division" and "research division". The number of compartments may be set freely for each system. If one compartment is used, this compartment is omitted.

Each user can read a file having the same compartment as those given to the user and the same security level as that of the user or lower. Each user can write or create a file having the same compartment as those given to the user and the same security level as the user clearance or higher.

From another viewpoint, each file can be written with data or can be created by a user having the same clearance as the security level given to the file or lower, or can be read by a user having the same clearance as the security level given to the file or higher.

In mandatory access control, a user A having the clearance "secret" can read a file having a security level "unclassified", "confidential" or "secret" and cannot read a file having a security level "top secret". The user A can write data in a file having a security level "top secret" or "secret" and cannot write data in a file having a security level "unclassified" or "confidential".

The security level of a file permitted to read is different from the security level of a file permitted to write so that the security level set to information (file) is prevented from being lowered. If the user A is permitted to write data in an "unclassified" file, a "secret" file can be stored as an "unclassified" file so that the "secret" information is leaked to a user having an "unclassified" clearance. The mandatory access control can avoid such a danger.

The file access type in the mandatory access control of the embodiment includes: opening a file and reading the contents; rewriting information in a file, and creating a new file.

Rewriting information in a file is not related to opening the file. Namely, even if "rewriting" is possible, "reading" is not possible in some case. There may be a privilege of rewriting the contents of a file unable to read (the contents are not known). It is therefore possible to prevent information leakage when a user having a lower clearance rewrites a file having a higher security level.

In order to prevent the security level of a file from being lowered by rewriting, it may permit to write data including to rewrite original file information. On the other hand, only additional write may be permitted from the viewpoint of avoiding that information having a higher security level is rewritten by a user having a lower clearance.

Namely, a file access which reduces information in the file is called "delete", and a file access which increases information in the file is called "additional write". In order only to prevent illegal leakage of information, both "delete" and "additional write" may be permitted for a file having the same compartment as those given to a user and having the same security level as that of the user or higher. In order to prevent alteration of information, "delete" may not be permitted and "additional write" may be permitted (however, in this case, "delete" may be permitted only when the security level is the same).

The security administrator uses the user label setting program 1023 to set a user clearance, for example, when user registration is first performed on the host OS 1017. Alternatively, when a user first performs a file access, the user label setting program 1023 may be automatically activated by hooking the file access. If activation of the user label setting program 1023 is not set, there is a possibility that a file access occurs in the state that user clearance is not set (i.e., in the state that the user clearance is not registered in the user list 1041 managed by the guest OS 1019). In this case, it may be set in such a manner that any file access is not permitted, or it may be assumed that the lowest clearance is given (in this embodiment "unclassified"), depending upon the system security policy.

The security level of a file is set when a user creates the file, for example, expressly by a user. A settable security level is determined by the clearance of the user. Namely, the same security level as the clearance of the user or higher is settable. Generally it is preferable from the security viewpoint that the security level once set is not permitted to be lowered later. However, in order to improve use convenience, the security level may be lowered by a user having a specific privilege, e.g., a security administrator, by using the file label setting program 1025.

A security administrator who sets the user clearance may be the same as or different from a security administrator who sets the file security level. A plurality of reliable administrators may be used. For example, a security administrator who sets the user clearance and file security level may be used at each compartment.

Figure 2:
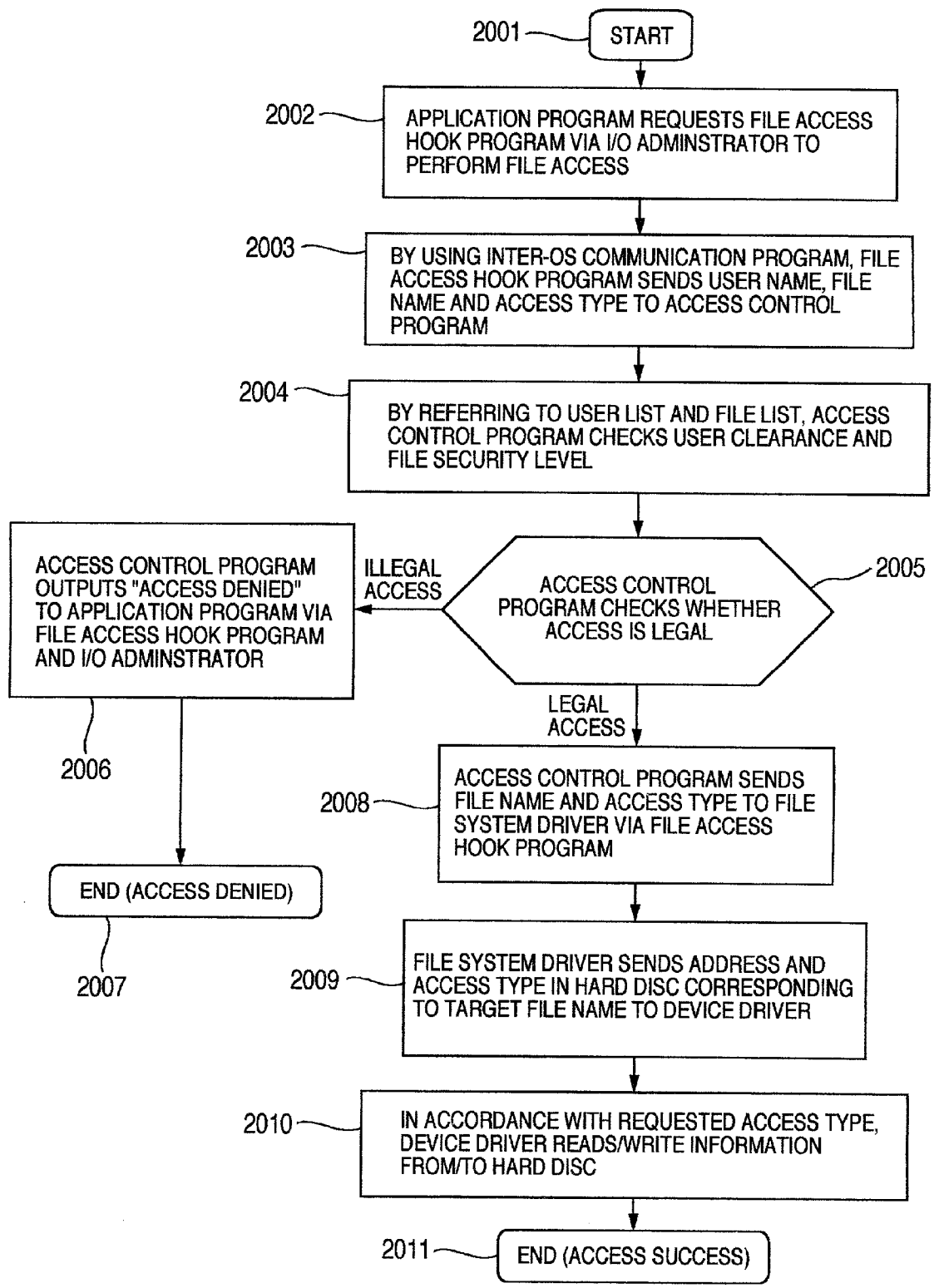
FIG. 2 is a flow chart illustrating a file access control (read, write) according to the first embodiment.

With reference to FIG. 2, a file access control process (read, write) of the embodiment will be detailed.

Step 2001: Start.

Step 2002: The application program 1021 requests the file access hook program 1029 via the I/O administrator 1027 to perform a file access.

Step 2003: By using the inter-OS communication program 1051, the file access hook program 1029 sends the user name, file name and access type to the access control program 1035. The user name can be acquired by referring to correspondence information between a process of the application program 1021 and the name of the user who executes the process. This correspondence information is used for realizing the process management function which is one of the functions possessed by the host OS itself.

Step 2004: By referring to the user list 1041 and file list 1043, the access control program 1035 checks the clearance of the user and the security level of the file.

Step 2005: The access control program 1035 checks whether the access is a legal access. If the access is legal, the flow advances to Step 2008, whereas if not, the flow branches to Step 2006.

Step 2006: The access control program 1035 outputs "access denied". This judgement result is notified to the application program 1021 via the file access hook program 1029 and I/O administrator 1027.

Step 2007: End (Access denied).

Step 2008: The access control program 1035 sends the file name and access type to the file system driver 1031 via the file access hook program 1029.

Step 2009: The file system driver 1031 sends the address and access type in the hard disc A 1013 corresponding to the target file name to the device driver 1033.

Step 2010: The device driver 1033 reads the target file from the hard disc A1013 and sends it to the application program (in a read operation), or writes information instructed by the application program 1021 into the hard disc A 1013 (in a write operation).

Step 2011: End (Access success).

Figure 3:
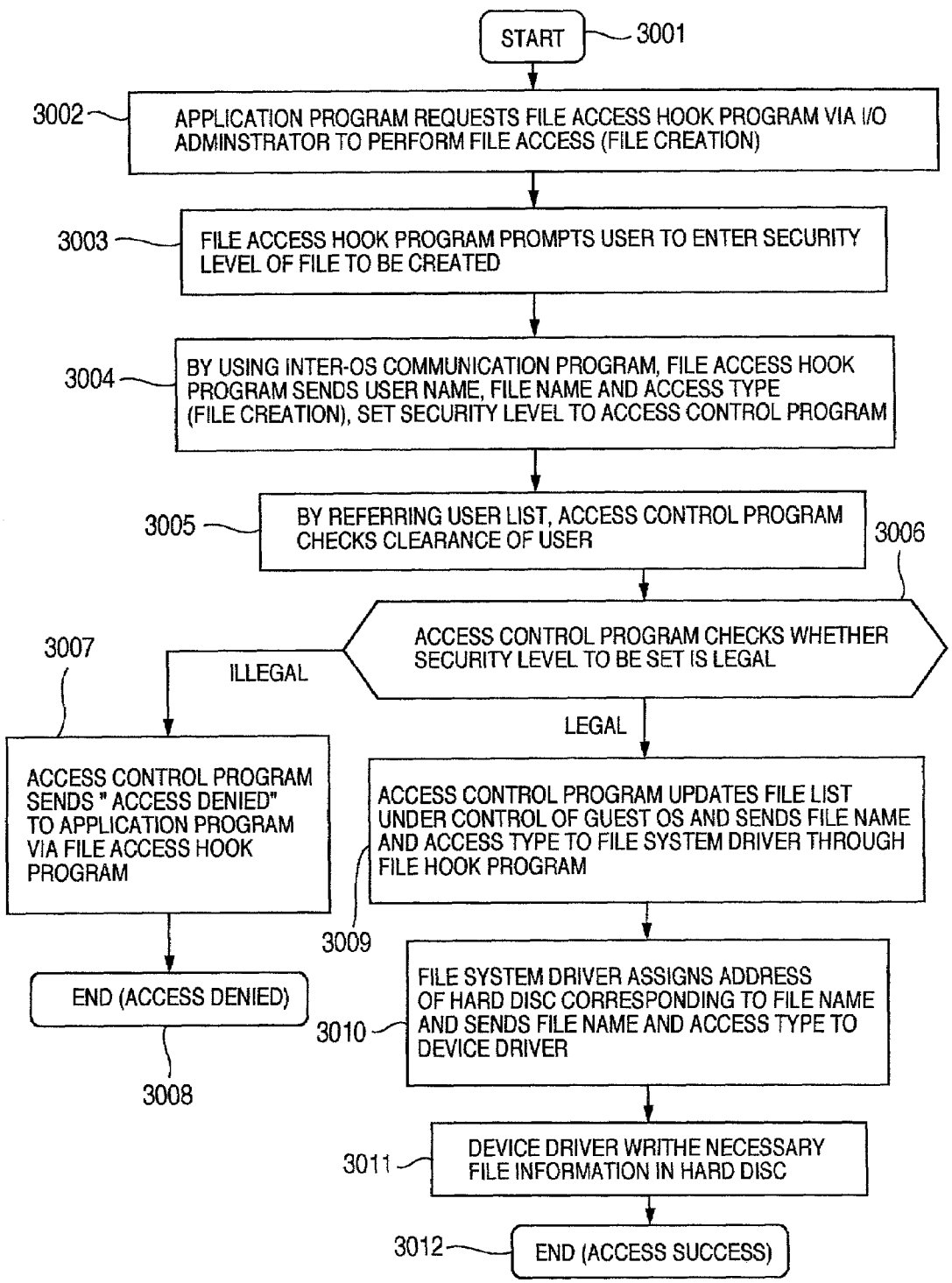
FIG. 3 is a flow chart illustrating a file access control (file creation) according to the first embodiment.

With reference to FIG. 3, a file access control process (file creation) of the embodiment will be detailed.

Step 3001: Start.

Step 3002: The application program 1021 requests the file access hook program 1029 via the I/O administrator 1027 to perform a file access (file creation).

Step 3003: By using a user interface, the file access hook program 1029 prompts the user of the application program 1021 to enter the security level of a file to be created.

Step 3004: By using the inter-OS communication program 1051, the file access hook program 1029 sends the user name, file name and access type to the access control program 1035. The user name can be acquired in a manner similar to Step 2003.

Step 3005: By referring to the user list 1041, the access control program 1035 checks the clearance of the user.

Step 3006: The access control program 1035 checks whether the security level to be set is legal. If legal, the flow advances to Step 3009, whereas if not, the flow branches to Step 3007.

Step 3007: The access control program 1035 outputs "access denied". This judgement result is notified to the application program 1021 via the file access hook program 1029 and I/O administrator 1027.

Step 3008: End (Access denied).

Step 3009: The access control program 1035 updates the file list 1043 managed by the guest OS 1019 and sends the file name and access type (file creation) to the file system driver 1031 via the I/O administrator 1027.

Step 3010: The file system driver 1031 assigns an address of the hard disc A 1013 corresponding to the file name and sends the address and access type to the device driver 1033.

Step 3011: The device driver 1033 writes information instructed by the application program 1021 in the hard disc A 1013.

Step 3012: End (Access success)

FIG. 6 shows an example of the user list 1041 of the embodiment. File names 6001 are written in the first column, and security levels 6003 of the corresponding files are written in the second column.

FIG. 7 shows an example of the file list 1043 of the embodiment. User names 7001 are written in the first column, and clearances 7003 of the corresponding users are written in the second column.

FIG. 8 shows security levels of files permitted for a user "researcher" of the embodiment to access in accordance with the concept of the mandatory access control. The second to fifth columns show the compartments (personnel divisions 8001, 8021, business divisions 8003, 8023, planning divisions 8005, 8025, research divisions 8007, 8027) and the second to fifth rows show the security levels (top secret 8009, 8029, secret 8011, 8031, confidential 8013, 8033, unclassified 8015, 8035).

As shown in FIG. 7, the clearances given to the "researcher" are "research division•secret" and "planning division•confidential". Therefore, according to the concept of the mandatory access control, the "researcher" can access and read files of "research division•secret, confidential, unclassified" and "planning division•confidential, unclassified", and can access and write data in or create files of "research division•top secret, secret" and "planning division•top secret, secret, confidential". For example, since the security level of a file "C:¥home¥user¥research_report.doc" is "research division•secret", this file can be read and written, whereas since the security level of the file "C:¥home¥user¥secret.txt" is "business division•secret, planning division•secret", this file can only be written.

The access control program 1035 has in advance rules or tables of the contents shown in FIG. 8 in order to perform access control by referring to the rules or table.

Although the tables shown in FIG. 8 show the security levels of files accessible by a particular user, tables showing users accessible to a particular file may be formed.

As described above, according to the embodiment, the host OS 1017 is provided with the mandatory access control function which operates with a priority over the application program. Therefore, in this embodiment, there is a possibility that an initially permitted file access by the application program running on the host OS 1017 is inhibited. However, the application program itself can be used without any modification.

An operation of a text editor program under the management of the host OS 1017 will be described by way of example. It is assumed that the clearance of a user U is "secret" in "research division", the security level of a file F1 is "secret" in "research division" and the security level of a file F2 is "confidential" in "research division". If the user tries to designate the file name "F1" and read the contents of the file by executing the text editor program and using the "file open" function of the text editor program, this access is inhibited by the embodiment functions because the access is not permitted by the mandatory access control. A message that the file cannot be opened is notified (displayed) to the user.

The message display to the user may be performed by using the function of the host OS 1017 itself. Namely, a file access control function of the host OS 1017 different from the embodiment access control is used to use the display message which is displayed when a user tries to read a "read inhibited" file.

Similarly, if the user tries to designate the file name "F2" and read the contents thereof by using the "file open" function, the contents of the file are read by the text editor program (the general operation on OS as viewed from the user) because this file access is permitted.

If the user edits the file and tries to overwrite the edited contents as the file name "F2" by using an "overwrite-save" function of the text editor program, this access is inhibited because this access is not permitted. A message that the file cannot be saved is notified (displayed) to the user. The message display to the user may be performed by using the function of the host OS 1017 itself.

If the embodiment is modified to permit only the "additional write" to allow the text editor program to perform additional write without opening the file, the user U can perform the additional write of the file F1. However, if a text editor program cannot edit (in this case additional write) unless the contents of a file are once read, reading (opening) the file is not permitted so that the additional write is not possible.

Similar to file transfer in the same hard disc, a file transfer may be realized without reading data in the hard disc A 1013 in the memory A 1005 by only rewriting a file name including path information, i.e., by rewriting a correspondence table between the file name and an address of the file in the hard disc without transferring the file itself. Any user may be allowed to perform such a file access. In this case, in order to maintain the integrity of the file list 1043, when the file transfer is performed, the file name 6001 in the file list 1043 is rewritten.

Any user may be allowed to perform file copy if there is no danger that data in the file is illegally read during file copy, for example, if the hard disc itself has a file copy function. In this case, the security level of the file is copied at the same time. Namely, an entry of the file is required to be added to the file list 1043 and the same security level as that of the copy source is required to be set.

If a file is moved or copied to a removable portable storage medium such as a floppy disc, the file is enciphered in accordance with the security level of the file. Information on the file in the file list 1043 may be written in the portable storage medium.

These processes can be realized by adding proper functions to the access control program 1035.

Figure 4:
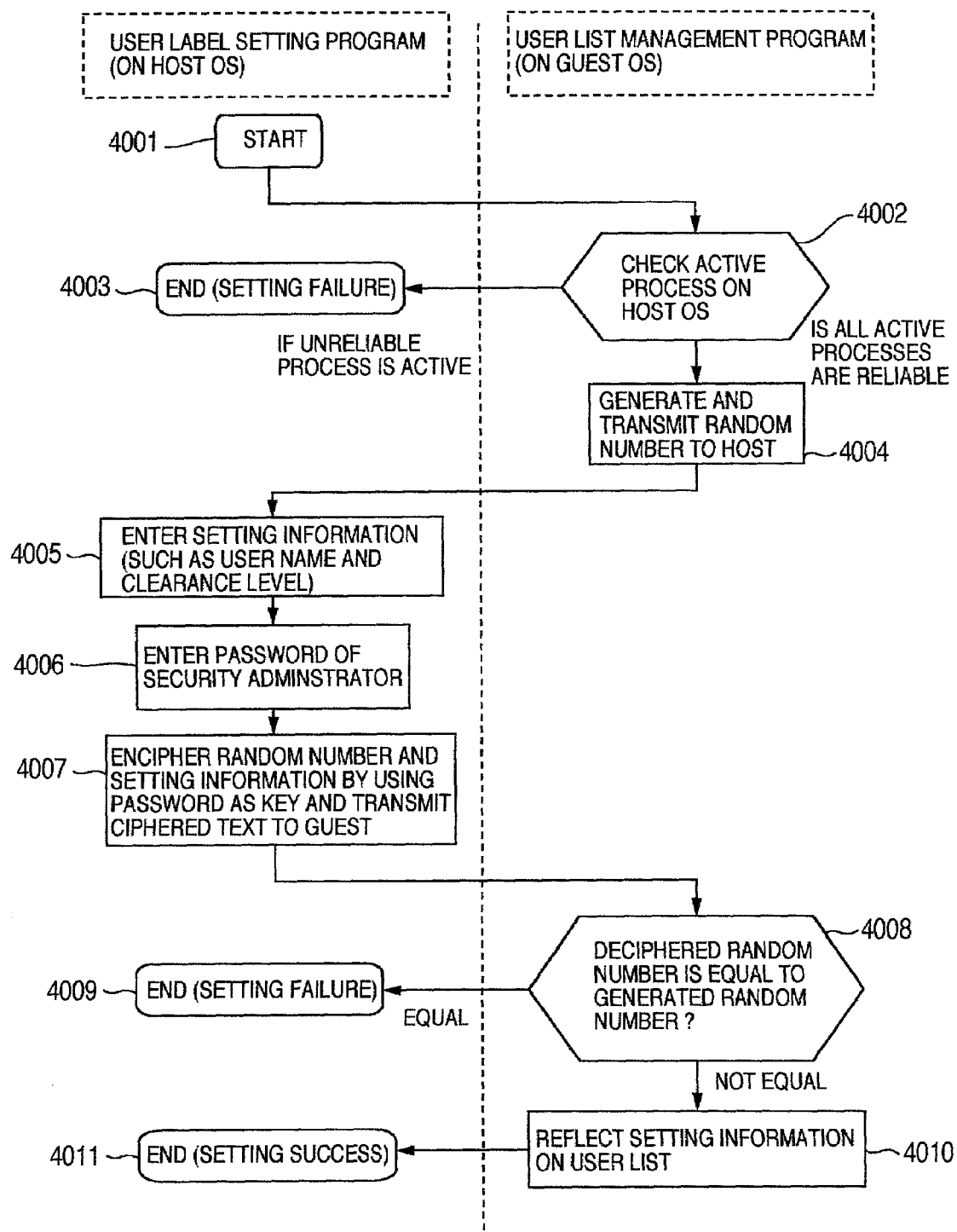
FIG. 4 is a flow chart illustrating a file access control (read, write) according to the first embodiment.

With reference to FIG. 4, a user label setting process according to the embodiment will be described.

(A process to be executed by the user label setting process by the user label setting program 1023 running on the host OS 1017).

Step 4001: Start.

(A process to be executed by the user list management program 1037 running on the guest OS 1019).

Step 4002: An active process on the host OS 1017 is checked. If an unreliable process is active, the flow branches to Step 4003, whereas if not, the flow advances to Step 4004.

Step 4003: End (Setting failure).

Step 4004: A random number R is generated and transmitted to the host side.

(A process to be executed by the user label setting program 1023 running on the host OS 1017)

Step 4005: Request to enter setting information Cu (such as a user name and a user clearance level).

Step 4006: Request to enter a password P of a security administrator.

Step 4007: Concatenation of the random number R and setting information Cu is enciphered by using the entered password as a key to transmit the enciphered text to the guest side.

(A process to be executed by the user list management program 1037 running on the guest OS 1019).

Step 4008: The enciphered text received at the guest side is deciphered by using the password of the security administrator managed and retained beforehand by the guest OS 1019. If the random number contained in the deciphered information is different from the random number R generated at Step 4004, the flow branches to Step 4009, whereas if not, the flow advances to Step 4010.

Step 4009: End (Setting failure).

Step 4010: Setting information deciphered at Step 4008 is reflected upon the user list 1041.

Step 4011: End (Setting success).

Figure 5:
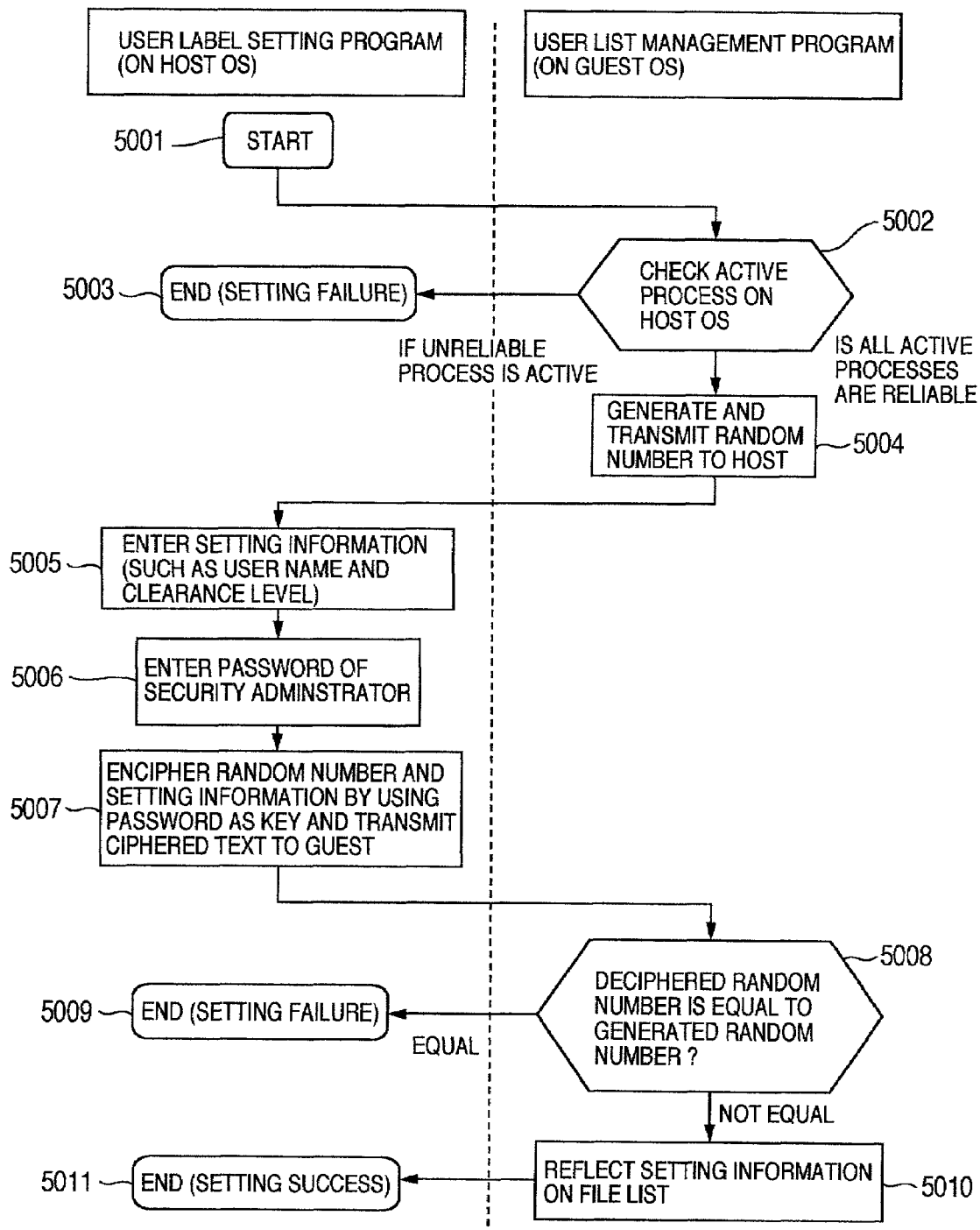
FIG. 5 is a flow chart illustrating file label setting according to the first embodiment.

With reference to FIG. 5, a file label setting process according to the embodiment will be described.

(A process to be executed by the file label setting program 1025 running on the host OS 1017).

Step 5001: Start.

(A process to be executed by the file list management program 1039 running on the guest OS 1019).

Step 5002: An active process on the host OS 1017 is checked. If an unreliable process is active, the flow branches to Step 5003, whereas if not, the flow advances to Step 5004.

Step 5003: End (Setting failure).

Step 5004: A random number R is generated and transmitted to the host side.

(A process to be executed by the file label setting program 1025 running on the host OS 1017)

Step 5005: Request to enter setting information Cf (such as a file name and a file security level)

Step 5006: Request to enter a password P of a security administrator.

Step 5007: Concatenation of the random number R and setting information Cf is enciphered by using the entered password as a key to transmit the enciphered text to the guest side.

(A process to be executed by the file list management program 1039 running on the guest OS 1019).

Step 5008: The enciphered text received at the guest side is deciphered by using the password of the security administrator managed and retained beforehand by the guest OS 1019. If the random number contained in the deciphered information is equal to the random number R generated at Step 5004, the flow branches to Step 5009, whereas if not, the flow advances to Step 5010.

Step 5009: End (Setting failure).

Step 5010: Setting information deciphered at Step 5008 is reflected upon the file list 1043.

Step 5011: End (Setting success).

In this embodiment, when the user label or file security level is set, identification or authentication between the user list management program 1037 or file list management program 1039 on the guest OS 1019 and the security administrator is performed by a method called challenge-response identification. Since the authentication result and setting information are transferred at the same time, illegal actions such as bypass of the authentication process can be prevented and the number of message transfers can be reduced.

The challenge-response identification is detailed in the document [HAC]: Alfred J. Menezes, Paul C. van Oorschot, Scott A. Vanstone, "Handbook of Applied Cryptography", CRC Press, 1997. The cryptography process using the challenge-response identification may be performed, for example, by using the cipher-block chaining (CBC) mode of the Data Encryption Standard (DES) (refer to the document [HAC]). A common key cryptography may be used. This embodiment may use an authentication method (e.g., a method based upon a public key cryptography) other than the challenge-response authentication disclosed in the document [HAC].

As described above, according to the embodiment, the mandatory access control function is given to the guest OS 1019 different from the usually used host OS 1017 directly used by a user. It is therefore possible to prevent illegal actions against the mandatory access control function while the mandatory access control function is realized without modification of the application program 1021 on the host OS 1017.

Even if the host OS 1017 is changed to provide multi-function and versatility, the mandatory control is possible without changing the fundamental architecture.

In setting the user clearance and file security level, authentication of the security administrator (who is generally different from a system administrator of the host OS 1017 side) is performed so that danger of illegal actions by the system administrator on the host OS 1017 side can be mitigated.

(Second Embodiment)

Another embodiment of the invention will be described with reference to the accompanying drawings.

As described earlier, if the system of the first embodiment operates normally, illegal access to a file becomes very difficult and the system can be operated securely. Further threat against this system may be alteration of a file storing the program of the host OS before start-up of the system in order to escape from the access control function of the guest OS side of the first embodiment. In this second embodiment, a method of presenting such an illegal action is provided.

FIG. 9 shows an example of the structure of a computer system according to the second embodiment. The different points from the system shown in FIG. 1 reside in that a file (enciphered file 9001) in the hard disc A 1013 managed by the host OS 1017 is an enciphered file and that an enciphering program 9003, a deciphering program 9005 and a cipher key (also called a symmetric key) 9007 all managed by the guest OS 1019 are additionally provided.

In this embodiment, when a file is written, first the access control similar to the first embodiment is performed and if the access is legal, the file is enciphered by the enciphering program 9003 on the guest OS side and then stored in the hard disc A 1013 on the host OS 1017 side.

When a file is read, the access control similar to the first embodiment is performed and if the access is legal, the file (enciphered file) stored in the hard disc A 1013 on the host OS 1017 side is deciphered by the deciphering program 9005 and then passed to the application program 1021 on the host OS 1017 side.

If a file access on the host OS side uses the access control program on the guest OS side (i.e., if the access control program on the host OS side is not bypassed), the application program 1021 can transparently access the enciphered file in the hard disc A 1013 without being conscious of cryptography so long as the access is legal.

If the file storing the program of the host OS is altered or tampered before the host OS is loaded in a memory and an illegal host OS is activated, an illegal action of escaping the access control function on the guest OS becomes possible. However, since the read file has been enciphered, this file cannot be read (information leakage does not occur). It is therefore possible to practically start up the guest OS and its access control function. Even if the hard disc drive is dismounted and connected to another computer to analyze the file, this analysis is impossible because the file has been enciphered.

In order to more reliably confirm the absence of an illegal action against the host OS, a host OS verification function may be given to the guest OS. For example, a digital signature of the host OS program still not tampered is held beforehand under the management of the guest OS. The guest OS is provided with an input/output process checking unit which confirms through the verification process of the digital signature that the host OS program actually activated was not tampered before the start-up of the host OS. The input/output process checking unit may use the process management function on the host OS side to check whether an illegal process is not executed under the management of the host OS.

If the host OS program was tampered, the guest OS is instructed to invalidate the functions of the host OS, for example, by inhibiting all file accesses or stopping the execution of the host OS. The invalidation of the functions because of the tampered host OS may be notified to the user by displaying a message on the display connected to the computer, reproducing alarm sounds from speakers connected to the computer, or displaying a message on an external apparatus.

Figure 10:
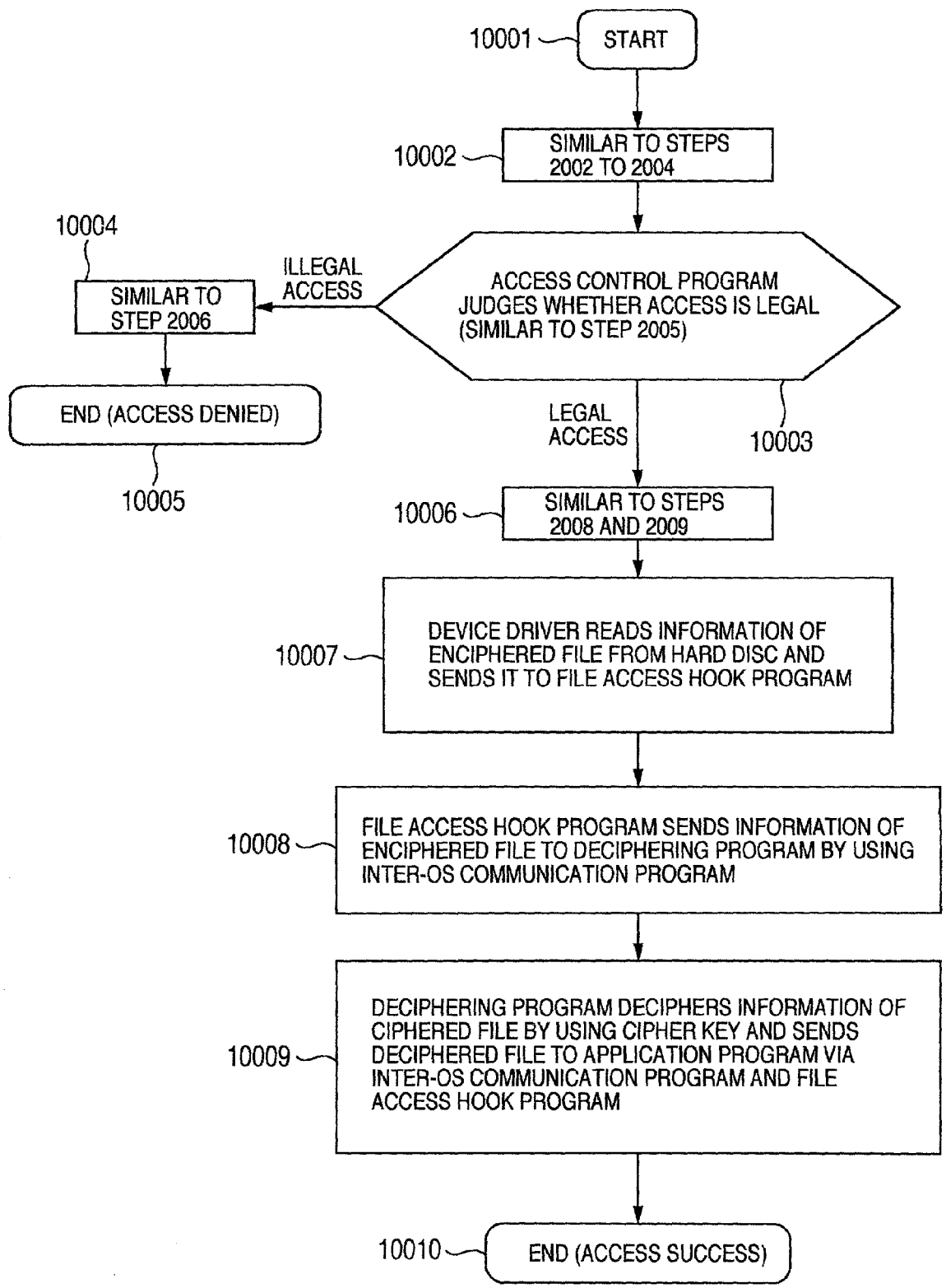
FIG. 10 is a flow chart illustrating a file access (read) control process according to the second embodiment.

With reference to FIG. 10, a file access control process (read) according to the embodiment will be described.

Step 10001: Start.

Step 10002: Similar to Steps 2002 to 2004.

Step 10003: The access control program judges whether the access is legal (similar to Step 2005). If legal, the flow advances to Step 10006, whereas if not, the flow branches to Step 10004.

Step 10004: Similar to Step 2006.

Step 10005: End (Access denied).

Step 10006: Similar to Steps 2008 and 2009.

Step 10007: The device driver reads the enciphered file from the hard disc and sends it to the file access hook program.

Step 10008: The file access hook program sends the enciphered file to the deciphering program by using the inter-OS communication program.

Step 10009: The deciphering program deciphers the enciphered file by using the cipher key managed by the guest OS side and sends the deciphered file to the application program via the inter-OS communication program and file access hook program.

Step 10010: End (Access success).

Figure 11:
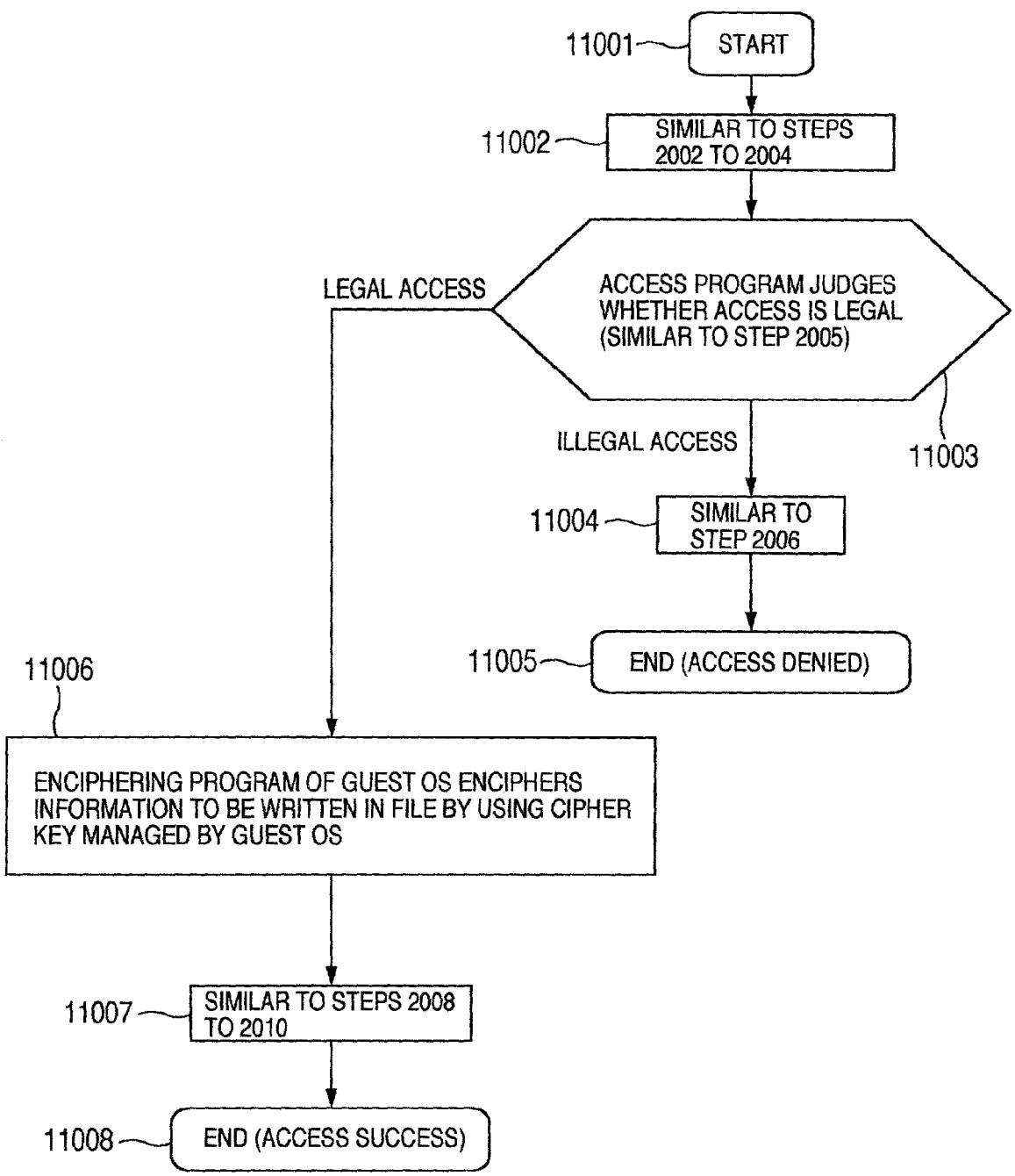
FIG. 11 is a flow chart illustrating a file access (write) control process according to the second embodiment.

With reference to FIG. 11, a file access control process (write) according to the embodiment will be described.

Step 11001: Start.

Step 11002: Similar to Steps 2002 to 2004.

Step 11003: The access control program judges whether the access is legal (similar to Step 2005). If legal, the flow advances to Step 11006, whereas if not, the flow branches to Step 11004.

Step 11004: Similar to Step 2006.

Step 11005: End (Access denied).

Step 11006: The enciphering program of the guest OS side enciphers information to be written by the application program 1021, by using the cipher key managed by the guest OS side.

Step 11007: Similar to Steps 2008 to 2010.

Step 11008: End (Access success).

A file access control process for file creation is fundamentally the same as the file access control process (write) shown in FIG. 11, excepting that Step 11002 is changed to Step 11002': Similar to Steps 3002 to 3005.

The deciphering process at Step 10009 and the enciphering process at Step 11006 may be performed by the cipher-block chaining (CBC) mode of the Data Encryption Standard (DES) (refer to the document [HAC]). Even if the CBC mode is used, if the same plain text is enciphered by the same key, the same enciphered text is formed for the first block length (64 bits in the case of DES). In order to avoid this, different initial values IV used by the CBC mode are set to each file. For example, in the enciphering process at Step 11006, a random number of 64 bits is generated and set to IV to encipher each plain text. IV is stored in the file list as an additional item. In the deciphering process at Step 10009, IV corresponding to the target enciphered text is read from the file list to decipher the enciphered text.

In this embodiment, although the ciphering process is performed by using one cipher key, a plurality of cipher keys may be used. For example, different keys or different ciphering methods may be used for each security level and compartment of a file. In this case, the number of security levels of the embodiment is four and the number of compartments are four. Therefore, sixteen different cipher keys are used. These keys are managed by the guest OS. Furthermore, ciphering methods and keys having different safety levels may be used depending upon the security level of a file. For example, an encipher key having a long key length may be used for the file having a high security level.

The cipher key used by the embodiment may be stored in a hardware module (e.g., an IC card) different from the hard disc B 1015. In this case, the hardware module may be provided with a function of verifying that the guest OS 1019 and various programs (such as the access control program 1035) running on the guest OS were not tampered. Only after it is confirmed that the guest OS and various programs are legal, the cipher key can be used (e.g., the key is loaded in the memory B 1007) so that a threat of alteration on the guest OS side can be mitigated.

In this embodiment, although the contents themselves of a file are enciphered, a file management table may be enciphered. The file management table is generally stored in the hard disc in an area different from the file area. The file management table stores a correspondence between each file name and its address information indicating the area where the file is stored. If the address information is enciphered, it is difficult to check the area of the disc in which the file information is stored. Leakage of the file information can therefore be prevented. Furthermore, since the data size of the file information to be enciphered is small, the process amount of ciphering can be made small.

In the second embodiment, similar to the first embodiment, the file access hook program 1029 detects a file access instruction to the file system driver 1031 of the I/O administrator 1027, and passes the file access instruction to the access control program 1035 on the quest OS 1019 before it is passed to the file system driver 1031. The embodiment is not limited only thereto. For example, the file access hook program 1029 may pass a file access (e.g., read) instruction to the access control program 1035 at the same time when the instruction is passed to the file system driver 1031 or after it is passed to the file system driver 1031. In this case, if the file access is illegal, the deciphering process at Step 10009 is not executed. Even if an illegal read process is executed, the enciphered file is read to the application program so that leakage of information will not occur.

The guest OS may be provided with not only the mandatory access control function as in the first and second embodiments but also other functions.

For example, the guest OS may be provided with a function (file access log management function) of recording the information of file accesses on the host OS side and storing this information. This information may be an access time, an access user name, an access program name, an access target file name, an access type, changed contents of a file, and the like.

Since the guest OS is provided with such a file access log management function, file access can be recorded without modifying the host OS and the application programs on the host OS. Furthermore, there is no danger that the recorded file access log is altered or deleted on the host OS side.

The guest OS side may be provided with a computer virus countermeasure program for detecting or exterminating computer viruses. The guest OS may be provided with a function of transmitting and receiving information of a detected virus to and from another computer via the network.

A function may be realized which is requested expressly by an application program of the host OS side to be executed. For example, such a function may be a digital signature generating function, a public key deciphering function, a function managing secret key information to be used by such functions. A signature method utilizing a signature history at the time when a digital signature is generated and a signature history management method disposed in JP-A-2000-313123 by the present inventors may also be realized.

In this case, as different from the file access control function, file access log management function and the like, an application program on the host OS is required to be compatible with the function to be realized on the guest OS side. During execution, specific user authentication is performed by a process similar to the user label setting process and file label setting process, so that illegal actions by the system administrator on the host OS side can be prevented. These functions and methods, particularly the function of using secret key information of each user such as the digital signature generating function and the public key deciphering function, are suitable. A function may be realized which is requested expressly by an application program on the OS side to execute the computer virus countermeasure program.

In each embodiment, software under the management of the guest OS different from the host OS realizes the access control of a file on the host OS directly utilized by a user, by utilizing multi-OS control techniques. The invention is not limited only thereto. For example, the guest OS and one or more of the functions (processing units) given to the guest OS may be realized by hardware. The user list, file list, a password of a security administrator, a cipher key for file enciphering and the like may be stored in the hardware.

According to the embodiment, safety of information security of an information processing system can be improved without damaging use convenience of users.

It should be further understood by those skilled in the art that the foregoing description has been made on embodiments of the invention and that various changes and modifications may be made in the invention without departing from the spirit of the invention and the scope of the appended claims.

What is claimed is:

1. A computer system having an input/output processing unit for executing a file access, an access execution unit for requesting a file access via the input/output processing unit in response to a user instruction, and an access control unit for performing access control when the access is executed, wherein the access control unit comprises:

a storage unit protected from the access execution unit;

a file list stored in the storage unit describing security levels of files;

a user list stored in the storage unit describing clearances of users;

an access control processing unit for determing whether the file access is legal in accordance with the file list, the user list, an access type of the file access, information identifying a file, and information identifying a user, wherein if a host OS program of the access control processing unit is tampered with, a guest OS of the access control processing unit is instructed to invalidated one or more functions of the host OS program;

an enciphering unit for encrypting a file when storing the file on a storage medium;

a deciphering unit for decryping the encrypted file when retrieving the encrypted file from the storage medium; wherein the storage unit stores at least one cipher key commonly used among a plurality of security levels for each file, the cipher key used for both encrypting and decrypting; and an access monitor unit which:

when the input/output processing unit executes a file access, sends the access type, the information identifying the file, and the information identifying the user to the access control processing unit;

receives a validity determination result of the file access from the access control processing unit; and if the file access is legal, causes the input/output processing unit to execute the file access, and if the file access is illegal, inhibits the file access.

2. A system as in claim 1 further comprising an exclusive control unit for protecting, from the access execution unit, a storage area of the storage unit to be used by the access control processing unit.

3. A system as in claim 2 further comprising a user list setting/managing unit for setting and managing the user list.

4. A system as in claim 3 wherein the user list setting/managing unit includes an authentication unit for authenticating a security administrator.

5. A system as in claim 4 wherein the security administrator is different from a system administrator who manages the access execution unit.

6. A system as in claim 1 further comprising a file list setting/managing unit for setting and managing the file list.

7. A system as in claim 6 wherein the file list setting/managing unit includes an authentication unit for authenticating a security administrator.

8. A system as in claim 7 wherein the security administrator is different from a system administrator who manages the access execution unit.

9. A system as in claim 1 further comprising:
an enciphering unit for encrypting a file if the file access requesting to output a file to the storage unit is legal; and
a deciphering unit for decrypting the enciphered file if the file access for requesting to input the enciphered file from the storage unit is legal.

10. A system as in claim 9 wherein an exclusive control unit protects from the access execution unit a storage area in the storage unit storing at least one key information set to be used by the enciphering unit and the deciphering unit.

11. A system as in claim 1 wherein the enciphering unit and the deciphering unit use a plurality set of different key information and at least one cipher method for each security level written in the file list.

12. A system as in claim 1 further comprising an input/output monitor unit for monitoring that the input/output processing unit or the access monitor unit is not tampered or performs a predetermined operation, and instructing to inhibit an input/output of a file if the input/output processing unit or the access monitor unit is tampered or performs an operation different from the predetermined operation.

13. A system as in claim 1 further comprising a file access log processing unit for storing and managing information on each file access sent to the access control processing unit.

14. A system as in claim 1 wherein to access control unit is realized by a software module.

15. A system as in claim 1 wherein the access control unit is realized by a hardware module.

16. A system as in claim 1 wherein the key comprises a symmetric key.

* * * * *